United States Patent [19]

Basu

[11] 3,921,278
[45] Nov. 25, 1975

[54] METHOD AND APPARATUS FOR REMOVING ROLL FILM FROM CASSETTES

[75] Inventor: Prithwis Basu, Munich, Germany

[73] Assignee: Agfa-Gevaert Aktiengesellschaft, Leverkusen, Germany

[22] Filed: July 3, 1974

[21] Appl. No.: 485,734

[30] Foreign Application Priority Data
July 12, 1973 Germany............................ 2335453

[52] U.S. Cl................ 29/427; 29/200 D; 83/925 R; 242/55; 242/71.1; 242/71.2
[51] Int. Cl.² ........................................ B23P 19/02
[58] Field of Search................... 242/55, 71.1, 71.2; 29/427, 426, 200 D, 200 B, 200 R, 211 D; 83/54, 925 R; 222/423; 225/2; 408/87

[56] References Cited
UNITED STATES PATENTS

| | | | |
|---|---|---|---|
| 3,265,263 | 8/1966 | Lafontant et al. ...................... | 225/2 |
| 3,364,551 | 1/1968 | Napor et al. ....................... | 29/211 D |
| 3,364,552 | 1/1968 | Napor et al. ....................... | 29/211 D |
| 3,429,042 | 2/1969 | Lawrence et al. ..................... | 408/87 |
| 3,768,133 | 10/1973 | Scappator et al. ................. | 29/200 D |
| 3,811,634 | 5/1974 | Edwards ................................ | 242/55 |
| 3,823,888 | 7/1974 | Zangenfeind et al. ................ | 242/55 |

*Primary Examiner*—C. W. Lanham
*Assistant Examiner*—James R. Duzan
*Attorney, Agent, or Firm*—Michael S. Striker

[57] ABSTRACT

Cassettes of the type wherein the film is convoluted on a core which is rotatable in an elastic cylindrical shell having a longitudinally extending mouth and carrying at its ends detachable apertured covers are opened by mounting a cassette on a pivotable carrier which supports a film-engaging blade insertable into the mouth of a loaded cassette. The carrier is thereupon pivoted to locate the cassette at a film removing station where the shell is engaged by two jaws which reduce the width of the mouth and thereby facilitate the detachment of one of the covers by the prongs of a forked stripping member. The ends of the shaft of the core are then engaged by two driven shafts which rotate the core in a direction to collect the film thereon whereby the blade prevents clockspringing of the convoluted film. A recessed shifting member is thereupon moved into register with the open end of the shell, the jaws are retracted, and the shifting member is moved axially toward the shell to engage its open end and to push it axially and away from the convoluted film. The film is engaged by a driven band which rotates it in a direction to unwind the film from the core whereby the leader of the film engages the blade and is caused to enter a channel wherein it advances to a splicing station to be attached to the trailing end of the film which has been removed from the preceding cassette.

27 Claims, 4 Drawing Figures

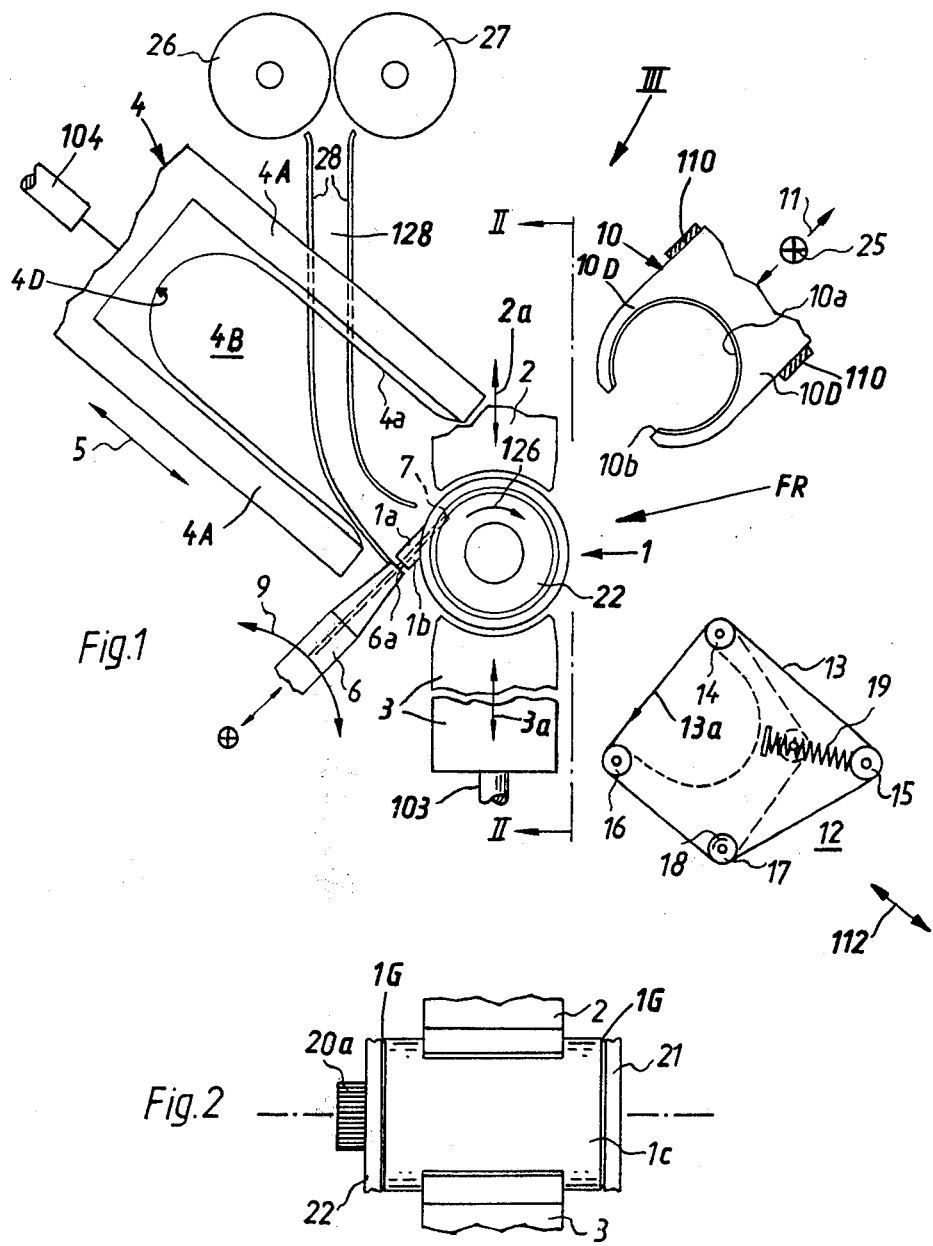

3,921,278

METHOD AND APPARATUS FOR REMOVING ROLL FILM FROM CASSETTES

BACKGROUND OF THE INVENTION

The present invention relates to a method and apparatus for removing photographic roll film from cassettes or analogous containers of the type wherein a core is surrounded by convoluted film which, in turn, is surrounded by a deformable cylindrical shell whose ends are attached to apertured end walls or covers and which is formed with a longitudinally extending mouth through which the film can be withdrawn in a camera to place successive film frames into register with the objective and through which the film passes during rewinding onto the core prior to removal of the container from the camera so that the container can be delivered or shipped to a developing laboratory. The apertures of end walls forming part of such containers afford access to the core so that the core can be rotated in a camera, first in a direction to pay out the film and thereupon in a direction to collect the film in the shell.

In accordance with a presently preferred procedure, exposed but undeveloped photographic film is withdrawn from cassettes by engaging the leader of film which leader is supposed to extend outwardly through the mouth of the cylindrical shell. Such mode of removing the film is likely to result in scratching of the emulsion in spite of the fact that the mouth is lined with a soft sealing material consisting of plush or the like. The pile of the sealing material is likely to accumulate foreign matter, particularly solid particles of dust or the like.

Another drawback of the just outlined conventional procedure is that it can be carried out only if the leader of the film actually extends through and beyond the mouth to such an extent that it can be readily engaged at the film removing station. Therefore, it is necessary to classify the cassettes which are furnished by customers to a developing laboratory in order to segregate cassettes with concealed leaders from other cassettes which can be properly manipulated by presently known film removing instrumentalities. This contributes to the cost of developing and prevents a fully automatic removal of film from each and every cassette.

SUMMARY OF THE INVENTION

An object of the invention is to provide a novel and improved method of removing photographic roll film from cassettes or analogous containers wherein the leader of convoluted film may but need not extend through and beyond the mouth of the shell.

Another object of the invention is to provide a method of removing film from cassettes in such a way that the film need not be moved lengthwise through the mouth during unwinding from the core so that the presence of dust or other foreign matter on the sealing elements which flank the mouth cannot affect the integrity of the emulsion.

A further object of the invention is to provide a method according to which the removal of film from a cassette can be carried out automatically irrespective of the accessibility or lack of accessibility of the leader, and which renders it possible to remove a large number of exposed films per unit of time without any damage to films, in a small area, and with a minimum of attention on the part of attendants.

An additional object of the invention is to provide a novel and improved apparatus which can be used to remove exposed photographic roll films from cassettes or analogous containers, whose operation is automatic and is not affected by accessibility or lack of accessibility of the leader, and which can further serve to transport the removed film through a developing apparatus, for example, to a splicing station where the leaders of successively removed films are attached to the trailing ends of preceding films.

Still another object of the invention is to provide a film removing apparatus wherein all operations, even including the feeding of successive containers into the range of instrumentalities which open the containers and remove the film therefrom, can be performed automatically so that the attendant or attendants which are present must merely perform a supervisory function but need not carry out any manual operations so that the reliability of the container-opening and film-removing operation is not affected by the conscientiousness or carelessness of an attendant, by the skill or lack of skill of attendants, by the presence or absence of attendants, and/or by fatique.

A further object of the invention is to provide the apparatus with novel and improved means for removing one or more end walls from the shells of cassettes or analogous containers for exposed roll film, with novel and improved means for preventing clockspringing of film during removal from a container, with novel and improved means for expelling the film from the shell of a partially opened container, and with novel and improved means for introducing the leader of a removed film into a predetermined path wherein the leader must advance on its way to a further processing station.

A feature of the invention resides in the provision of a method of removing photographic film (particularly exposed but undeveloped roll film) from containers or cassettes of the type wherein the film is convoluted on a core which is confined in and is rotatable relative to a substantially cylindrical deformable shell with a longitudinally extending slot or mouth for the passage of film and wherein the ends of the shell are connected with two apaertured end walls which afford access to the ends of the core and at least one of which is detachable from the shell, especially after the shell is deformed to reduce the width of the mouth.

The method comprises the steps of deforming the shell to thereby reduce the width of the mouth, detaching the one end wall from the deformed shell, rotating the core in a direction to collect the film, simultaneously holding the film against clockspringing in the shell, and removing the film from the shell including effecting a relative axial movement between the core and the shell so that the film leaves the shell through that end of the shell which becomes exposed in response to detachment of the one end wall.

The detaching step may comprise effecting a relative axial movement between the shell and the one end wall to thereby move the shell and the one end wall apart. The deforming step may comprise gripping and clamping the shell at two diametrically opposite sides intermediate the end walls.

The method may further comprise the step of locating and maintaining the container in a predetermined angular and axial position prior to and during the deforming step. The aforementioned holding step may comprise engaging the outermost convolution of the film on the core by a tool which is introduced through the mouth of the shell; such tool may resemble a thin elastically deformable blade having a width which equals or approximates the length of the mouth and the width of the film.

The method may further comprise the step of rotating the removed film in a direction to unwind it from the core, intercepting the leader of the rotating film (preferably by the aforementioned tool), and directing the intercepted leader into a predetermined path, preferably into a path wherein the leader advances toward a splicing station to be connected with the trailing end of the preceding film.

The novel features which are considered as characteristic for the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings.

BRIEF DESCRIPTION OF THE DRAWING

FIG. 1 is a fragmentary end elevational view of an apparatus which embodies the invention;

FIG. 2 is a fragmentary side elevational view as seen in the direction of arrows from the line II—II of FIG. 1 but showing the elements of the deforming means in positions in which they engage the deformable shell of a cassette at a film removing station;

DESCRIPTION OF THE PREFERRED EMBODIMENTS

Figure 3:
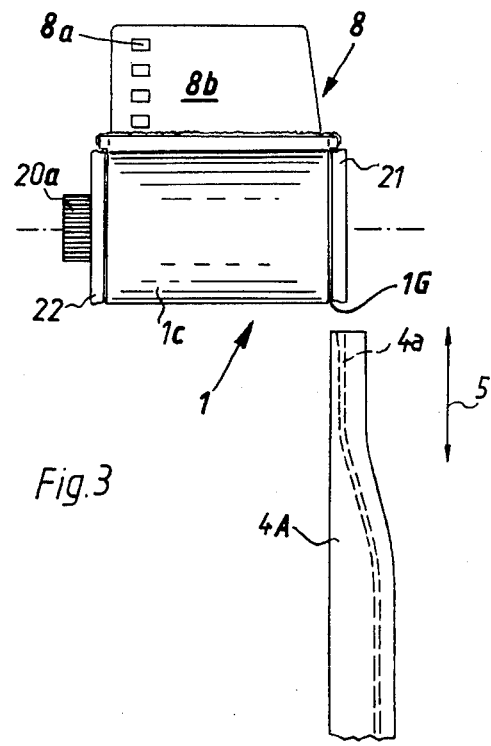
FIG. 3 is a fragmentary side elevational view substantially as seen in the direction of arrow III in FIG. 1.

FIG. 1 shows a container or cassette 1 for roll film 8 (FIGS. 3 and 4) which resembles a short cylinder and includes a cylindrical mantle or shell 1c (see particularly FIGS. 2 – 4) and two end walls or covers 21, 22. The shell 1c is formed with an axially parallel slot or mouth through which the film 8 passes during withdrawal from or during reintroduction into the cassette 1, and the mouth is bounded by two tangentially extending sealing lips of strips 1a, 1b made of plush or the like. The end portions of the shell 1c are formed with circumferential grooves 1G for internal ribs of the respective covers 21, 22, or the end portions of the shell 1c may be formed with external or internal ribs which extend into complementary internal or external grooves of the covers. Still further, the end portions of the shell 1c may be provided with external corrugations (i.e., with at least one groove between two ribs or with at least one rib between two grooves) and the adjacent portions of the covers 21, 22 may have a complementary configuration so as to insure that, in normal use, the covers cannot be separated from and thus sealingly engage the respective ends of the shell.

Figure 4:
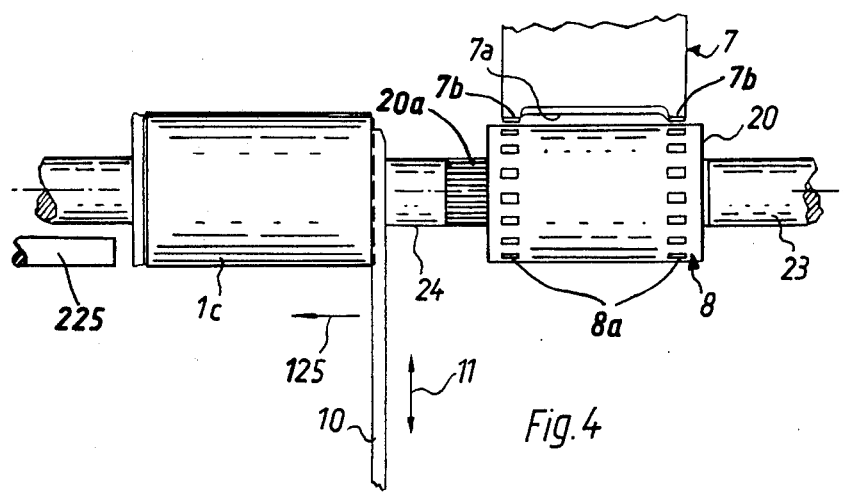
FIG. 4 is a view similar to that of FIG. 2 or 3 but showing the convoluted film upon removal from the shell.

The covers 21, 22 have centrally located circular apertures for the ends of a shaft 20a forming part of a core 20 of a flanged or flangeless reel for convoluted film 8 shown in FIGS. 3 and 4. Alternatively, the aperture in one of the covers 21, 22 may receive a portion of the shaft 20a for the core 20, and the aperture in the other cover may afford access to a suitably configurated coupling portion of the shaft 20a where the film transporting mechanism of a camera engages the shaft to rewind exposed film frames onto the core.

The cassette 1 of FIG. 1 is located at a film removing station FR where its shell 1c can be deformed and held by two clamping or gripping devices 2, 3 here shown as jaws which are movable in directions indicated by doubleheaded arrows 2a, 3a. The means for moving the jaw 3 into and from engagement with the shell 1c of a cassette 1 at the station FR may include a fluid-operated hydraulic or pneumatic motor having a piston rod 103. It is also possible to use an electromagnet having a reciprocable armature which is a functional equivalent of the piston rod 103. The means (not shown) for moving the jaw 2 is preferably identical with the means for moving the jaw 3, and the two moving means preferably operate in synchronism so that the jaws 2, 3 simultaneously engage with or release the shell 1c. When the covers 21, 22 are detached, the shell 1c exhibits a tendency to open up, i.e., to increase the width of the mouth between the sealing lips 1a, 1b. The orientation of a cassette 1 at the station FR is preferably such that the direction of movement of the jaws 2, 3 (arrows 2a, 3a) is normal or substantially normal to the common plane of the axis of the core 20 and the outermost portion of the mouth between the lips 1a, 1b. In FIG. 1, the jaws 2, 3 are movable vertically and the aforementioned plane is a substantially horizontal plane. When the jaws 2, 3 are moved toward each other beyond the positions shown in FIG. 1, they deform the shell 1c in such a way that the width of the mouth between the lips 1a, 1b is reduced, either to zero or to less than its normal width, whereby the cover 21 and/or 22 can be readily detached from the respective end of the deformed shell 1c by moving the cover axially and away from the shell and/or vice versa. Such detachment of the cover 21 and/or 22 from the deformed shell 1c necessitates the exertion of a relatively small force.

The means for detaching the deformed shell 1c from one of the covers 21, 22 (e.g. from the cover 21) or vice versa comprises a stripping member 4 which resembles a fork and is movable in directions indicated by a double-headed arrow 5. Such directions are substantially or exactly normal to the axis of a properly located cassette 1 at the station FR. The distance between the two prongs 4A of the stripping member 4 equals or closely approximates the outer diameter of the shell 1c of the aforementioned circumferential grooves 1G for the complementary internal ribs of the covers 21, 22. As best shown in FIG. 3, the facing inner sides of the prongs 4A are provided with elongated blades 4a whose thickness increases in a direction from the tips toward the rear portions of the respective prongs. Thus, when the stripping member 4 is moved radially of the cassette 1 to enter a groove 1G of the shell 1c, the blades 4a push the cover 21 away from the deformed shell 1c so that the respective end of the shell becomes open and expands to permit for extraction of the core 20 with convoluted exposed but undeveloped film 8 thereon. It is clear that the removal of film 8 from the cassette 1 takes place in a dark room or in an area which is illuminated in a manner to avoid damage to exposed film.

If desired, each blade 4a may have a constant thickness; however, the blades are then curved so that an intermediate portion of each blade resembles an extended helix. All that counts is to configurate the prongs 4A in such a way that, when they penetrate into a groove 1G, they push the respective cover away from the shell 1c and/or vice versa to thus effect a detachment of the cover. The depth of the recess 4B between the prongs 4A suffices to insure that the respective cover is separated from the shell 1c before the curved surface 4D at the bottom of the recess 4B reaches the shell. As a rule, the jaws 2, 3 will hold the deformed shell 1c against any axial and/or angular movement while the stripping member 4 moves toward the cassette 1 at the station FR; consequently, the blades 4a cause the cover 21 (see FIG. 3) to become separated from the clamped and deformed shell. The thus separated cover 21 can descend by gravity or is expelled from the recess 4B by a suitable ejector not shown, which may constitute a stop adjacent to the path of movement of the prongs 4A and engaging and ejecting a cover 21 from the recess 4B while the stripping member 4 moves away from the shell 1c at the station FR.

FIG. 1 further shows a film engaging tool 7 which is pivotable with a carrier 6 about a fixed axis in directions indicated by an arrow 9. The tool 7 may consist of elastically deformable sheet metal and has a width approximating or equaling the width of the film 8 (see FIG. 4). The leading edge of the tool 7 has an elongated shallow notch 7a to define in the leading edge two spaced-apart projections or teeth 7b which can engage the marginal portions of the film 8, for example, in the region of the respective rows of perforations 8a, so that they cannot damage the exposed portions of the film frames.

The stripping member 4 of FIG. 1 is located behind or in front of the film engaging tool 7 so that the carrier 6 for the tool 7 can pivot to and from the position of FIG. 1 without interfering with movements of the stripping member 4, or vice versa. The front end of the carrier 6 (from which the tool 7 extends) constitutes a shoulder or stop 6a which can abut against the outer end faces of the sealing lips 1a, 1b. An attendant who is in charge of positioning successive cassettes 1 at the station FR can properly orient a cassette by introducing the tool 7 into the mouth of the respective shell 1c so that the shoulder 6a of the carrier 6 abuts against the sealing lips 1a, 1b. The shell 1c is then in an optimum position for engagement by the jaws 2, 3, and one groove 1G of the shell is in register with the blades 4a on the prongs 4A of the stripping member 4. The sequence of steps is preferably such that an attendant attaches the cassette 1 to the film engaging tool 7 while the carrier 6 is maintained in a second position (to the left of the position shown in FIG. 1), and the carrier 6 is thereupon pivoted back to the illustrated position to thereby locate the shell 1c between the retracted jaws 2, 3. The means for moving the jaws 2, 3 toward each other are thereupon operated so that the jaws engage the shell 1c in optimum position with respect to the stripping member 4.

FIG. 1 further shows a shifting member 10 which may consist of substantially flat sheet metal stock. The member 10 is formed with a circular cutout or recess 10a having a diameter which slightly exceeds the outer diameter of a flange on the core 20 of the reel for the film 8. The member 10 is further formed with a relatively wide gap 10b which faces a cassette 1 at the station FR and communicates with the cutout 10a. The width of the gap 10b matches or slightly exceeds the diameters of two rotary shafts 23, 24 (FIG. 4). The arrow 11 indicates the directions in which the member 10 is movable radially of a cassette 1 at the station FR. The width of the gap 10b suffices to prevent any interference between the tool 7 and member 10 when the latter is moved toward the station FR. The shifting member 10 is further movable in suitable rails or ways 110 in parallelism with the axis of the shafts 23 and 24. The diameter of the cutout or recess 10a preferably increases in a direction from the one to the other side of the shifting member 10, i.e., the cutout 10a can be bounded by a conical surface which tapers in a direction away from the adjacent flange on the core 20 at the station FR. This facilitates the passage of the reel and convoluted film 8 thereon through the shifting member 10.

FIG. 1 further shows a drive 12 which can rotate the convoluted film 8 on a reel subsequent to withdrawal of film from the shell 1c. The drive comprises a driving member 13 here shown as an endless belt which is trained over four rollers 14, 15, 16, 17. At least one of the rollers 14–17 is constantly driven; for example, the roller 17 may be driven to rotate in the direction indicated by an arrow 18. The roller 15 is biased by a helical spring 19 which normally insures that the stretch 13a of the belt 13 between the rollers 14, 16 is flat. The parts 14, 16, 17, 19 are mounted on a frame (not shown) having a cutout or recess facing a cassette 1 at the station FR. The frame is movable towards and away from a cassette 1 at the station FR (see the arrow 112) by a mechanism which may be similar to the means for moving the jaw 3. When the stretch 13a engages the outermost convolution of film 8 on the core 20, the belt 13 is deformed so that its stretch 13a conforms to the outline of the adjacent portion of the outermost convolution of the film whereby the belt drives the film in the direction indicated by arrow 126, i.e., in a direction to unwind the film from the core 20. The exact manner in which the shaft for the roller 15 is movable between the solid-line and broken-line positions of FIG. 1, either in response to the bias of the spring 19 or in response to deformation of the stretch 13a by the convoluted film 8, forms no part of the invention; for example, the end portions of the shaft for the roller 15 can slide sideways in a suitable channel of the aforementioned frame.

FIG. 2 shows the jaws 2 and 3 in deforming engagement with the shell 1c of a cassette 1 at the station FR. The covers 21, 22 are still attached to the respective ends of the shell 1c, and one end of the shaft 20a of the core 20 extends through and beyond the central aperture of the cover 22.

In FIG. 3, the leader 8b of the film 8 extends through the mouth and from the interior of the shell 1c. The stripping member 4 is in the process of moving toward the cassette 1 in order to forcibly separate the cover 21 from the shell 1c while the latter is being deformed by the jaws 2 and 3 (not shown). The leading end of the blade 4a shown in FIG. 4 is about to enter the adjacent groove 1G in the right-hand end portion of the shell 1c.

FIG. 4 shows a further stage of film removal from a cassette 1 at the station FR. The teeth 7b of the tool 7 hold the withdrawn film 8 against clockspringing so that the convolutions of the film are tightly packed around the core 20. Also, the shifting member 10 has completed the axial displacement of shell 1c away from the core 20 and film 8 thereon. The gap 10b of the shifting member 10 registers with the teeth 7b of the tool 7 so that the member 10 can bypass the tool 7 during movement with the shell 1c from a position to the right of the core 20 to the illustrated position. The jaws 2 and 3 are withdrawn and the shaft 20a of the core 20 is held by the coaxial shafts 23, 24. These shafts bear with their ends against the respective ends of the shaft 20a. The shafts 23, 24 are rotatable in a direction to convolute the film 8 onto the core 20. It is preferred to configure the ends of the shafts 23, 24 in such a way that they enter matching sockets in the respective ends of the shaft 20a, or vice versa, to thus insure that the core 20 is compelled to rotate with the shafts 23, 24. The means for driving the shafts 23, 24 (or at least one of these shafts) may derive motion from the means for rotating the roller 17 of FIG. 1, or vice versa. The means for moving the shafts 23, 24 axially toward and away from each other may comprise two fluidoperated motors, not shown.

The operation:

In the first step, the carrier 6 is pivoted counterclockwise from the operative position of FIG. 1 and the film engaging tool 7 is introduced into the mouth of a cassette 1 containing a roll of exposed but undeveloped film 8. It is unimportant whether the leader or allonge 8b (see FIG. 3) which normally extends from the mouth of the shell 1c comes to lie on or is located below the tool 7. The carrier 6 is then pivoted back to the position of FIG. 1 whereby the cassette 1 assumes an optimum position for engagement by other parts which are mounted at or can enter the film removing station FR. The outer faces of the sealing lips 1a, 1b abut against the respective halves of the shoulder 6a at the front end of the carrier 6 and the tool 7 extends into the interior of the shell 1c.

In the next step, the jaws 2, 3 are moved from the retracted positions, through the intermediate positions of FIG. 1, and to the extended or operative positions shown in FIG. 2 to firmly engage and deform the shell 1c by reducing the width of the mouth between the lips 1a, 1b. The shell 1c is then held against any angular and/or axial movement and offers a relatively small resistance to detachment of the cover 21. Such detachment takes place in the course of the next-following step which includes a movement of the stripping member 4 toward the cassette 1 at the station FR so that the blades 4a of the prongs 4A enter the groove 1G of the shell 1c and cause the cover 21 to move axially of and away from the shell. The stripping member 4 is thereupon retracted whereby the detached cover 21 descends by gravity into a suitable receptacle or onto a conveyor, or is automatically expelled from the recess 4B by the aforementioned abutment or stop.

In the next step, the shifting member 10 is moved radially toward the remainder of the cassette 1 at the station FR to assume the innermost position shown in FIG. 4. At the same time or shortly before, the shafts 23, 24 are caused to move axially toward each other to engage the respective ends of the shaft 20a of the core 20. This renders it possible to retract the jaws 2 and 3 whereby the outer diameter of the shell 1c increases because the latter exhibits a tendency to expand, i.e., to increase the width of the mouth between the sealing lips 1a and 1b. Consequently, the outer diameter of the shell 1c becomes at least slightly but preferably substantially larger than the diameter of a flange on the core 20. At such time, or even before, the shafts 23, 24 are caused to rotate in the direction indicated by arrow 126 (FIG. 1) so as to collect the film 8 in the shell 1c. For example, the shafts 23, 24 can cause the core 20 to complete at least one but preferably two or more complete revolutions so as to insure that the entire leader 8b is retracted into the shell 1c. Since the teeth 7b of the tool 7 bear against the film 8 in the shell 1c, the tool then acts not unlike a brake and insures that the outermost part of the film forms one or more firmly packed convolutions, i.e., such outer convolutions are immediately adjacent to each other so that the convoluted film does not exhibit any traces of clockspringing.

In the next step, the shifting member 10 is moved in the direction indicated by arrow 125 (FIG. 4), i.e., in parallelism with the common axis of the shafts 23, 24, whereby the two arcuate portions 10D of the member 10 push the shell 1c and the cover 22 in front of them while the convoluted film 8 (held against clockspringing by the tool 7) remains at the station FR, i.e., the core 20 remains between the shafts 23 and 24 whereas the shell 1c and the cover 22 are shifted into the shaft 24. The diameter of the recess 10a in the shifting member 10 is large enough to enable the arcuate portions 10D of this member to pass around the convoluted film 8 and the gap 10b is in register with the tool 7 so that the latter cannot interfere with movement of the member 10 to the position of FIG. 4. The conicity of the surface surrounding the recess 10a facilitates the entry of the right-hand end of convoluted film 8 into the recess 10a while the member 10 moves in the direction indicated by the arrow 125, namely to the position shown in FIG. 4. The member 10 is thereupon retracted (radially of and away from the shaft 24) and moves subsequently counter to the direction indicated by the arrow 125 so as to reassume the starting position of FIG. 1 in which it is ready to again move toward the axis of a cassette 1 at the station FR as soon as the film 8 which has been removed from the preceding cassette 1 is transported away from the station FR.

The empty shell 1c, with the cover 22 adhering thereto, remains on the shaft 24 until the shaft 24 is retracted (by moving in the direction indicated by arrow 125, i.e., to the left of the operative position shown in FIG. 4). A suitable stop 225 which is adjacent to the path of the cover 22 on the shaft 24 then automatically removes the parts 1c, 22 from the shaft 24 and the parts 1c, 22 can descend into the aforementioned receptacle or onto the aforementioned conveyor.

The film 8 on the core 20 remains in the position of FIG. 4 as long as the shafts 23, 24 remain in the illustrated positions. The tool 7 holds the film against clockspringing. The frame for the belt 13 is caused to move toward the station FR (arrow 112) whereby the stretch 13a of the belt 13 engages the outermost convolution of the film 8 between the shafts 23, 24. The stretch 13a then surrounds at least one-half of the outermost convolution of the film 8 while the roller 15 dwells in the broken-line position of FIG. 1 but closer to the station FR. The feature that the stretch 13a can engage at least one-half of the outermost convolution of film 8 on the core 20 is desirable because this insures that the leader 8b of the film can be steered in a desired direction while the belt 13 rotates the film in a direction to unwind it from the core 20. As the belt 13 drives the convoluted film 8, the leader 8b moves against and is deflected by one or both teeth 7b and thereupon by the rear portion of the tool 7 so that the leader 8b enters the inlet of a channel 128 defined by two plate-like guide members 28 shown in FIG. 1. The leader 8b advances in the channel 128 and enters the nip of two driven advancing rolls 26, 27 which cause the leader to move toward a splicing station, not shown, where the leader is spliced to the trailing end of the preceding film so that two or more spliced-together films form an elongated web (not shown) which is ready to be transported through a suitable developing apparatus in a manner not forming part of the present invention.

The tool 7 can be pivoted away from the operative position of FIG. 1 not later than when the leader 8b enters the nip of the advancing rolls 26, 27 to thus reduce the force which is necessary to move the film lengthwise through and beyond the channel 128 and to reduce the likelihood of damage to film 8 by the teeth 7b of the tool 7. As mentioned above, the tool 7 is pivotable to and from the position of FIG. 1 together with its carrier 6.

The movements of the components 6, 4, 2, 3, 10 and 13 are preferably programmed so that they take place in a predetermined sequence to thus reduce the length of the interval which is required to remove the contents of a cassette 1 at the station FR. The construction of the programming means forms no part of the present invention; for example, all moving parts can be actuated by resorting to fluid-operated motors, (see the motor 104 for the stripping member 4 of FIG. 1), and the valves which admit a pressurized fluid to and permit escape of fluid from such motors may be actuated by the cams on a camshaft or by the lobes of a single rotary or reciprocable cam, not shown. It is also possible to use a plurality of electromagnets in combination with or in lieu of fluid-operated motors and to use one or more cams to actuate suitable switches for the electromagnets in a predetermined sequence.

The improved apparatus is susceptible of many additional modifications. For example, cassettes 1 can be fed to the film removing station FR by one or more magazines having chutes or the like which deliver the cassettes into the range of the components 7, 4, 2, 3, 10 and 13. It is also possible to employ a feeding means which includes one or more conveyors serving to advance successive cassettes to the position corresponding to that of the cassette 1 shown in FIG. 1. If the cassettes are not attached to the tool 7 at a locus outside of the station FR, the tool 7 preferably enters the mouth of a shell 1c at the station FR only after the cover 21 is removed, i.e., after the width of the mouth between the sealing lips 1a, 1b of a shell 1c at the station FR increases due to innate tendency of the shell to expand. Such mode of operation facilitates the introduction of teeth 7b into the mouth without damage to the film 8 and/or its leader 8b. It is clear that, if the cassettes 1 are fed by a magazine or conveyor, the apparatus must be provided with suitable orienting means, not shown, which insures that the mouth of a shell 1c at the station FR is in an optimum position for entry of the tool 7. Such orienting means may include a device (e.g., a driven member analogous to the belt 13) which turns the cassette 1 at the station FR or before the cassette reaches this station until the mouth of the shell 1c forming part of such cassette is properly positioned to receive the teeth 7b of the tool 7 when the latter is caused to move toward the cassette at the film removing station.

It is further within the purview of the invention to use two stripping members 4 which are operated in synchronism (either simultaneously or one after the other) so as to separate the covers 21, 22 before the shell 1c is slipped off the convoluted film 8 or before the core 20 with convoluted film is expelled from the shell. Such mode of taking the cassette apart is particularly desirable as regards the operation of the tool 7 because the width of the mouth between the lips 1a, 1b then increases to a much greater extent than upon removal of a single cover. Therefore, the apparatus will be designed to use two stripping members 4 if the cassettes are fed to the station FR from a magazine or by one or more conveyors so that the tool 7 enters a shell subsequent to completion of movement of the respective cassette to the station FR.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A method of removing photographic film from containers of the type wherein the film is convoluted on a core which is confined in and is rotatable relative to a substantially cylindrical deformable shell with a longitudinally extending mouth for the passage of film and wherein the ends of the shell carry apertured end walls which afford access to the core and at least one of which is detachable from the shell, comprising the steps of deforming the shell to thereby reduce the width of the mouth; detaching the one end wall from the deformed shell; rotating the core in a direction to collect the film thereon; simultaneously holding the film against clockspringing in the shell; and removing the film from the shell including effecting a relative axial movement between the core and the shell so that the film leaves the shell with the core through that end of the shell which becomes exposed in response to detachment of the one end wall therefrom.

2. A method as defined in claim 1, wherein said detaching step comprises effecting a relative axial movement between the shell and the one end wall to thereby move the shell and the one end wall apart.

3. A method as defined in claim 1, wherein said deforming step comprises gripping the shell at two diametrically opposite sides thereof.

4. A method as defined in claim 1, further comprising the step of maintaining the container in a predetermined angular and axial position prior to and during said deforming step.

5. A method as defined in claim 4, wherein said holding stop comprises engaging the outermost convolution of film on the core by a tool which is introduced through the mouth of the shell.

6. A method as defined in claim 1, further comprising the steps of rotating the film outside of the shell in a direction to unwind it from the core, intercepting the leader of the rotating film, and directing the intercepted leader into a predetermined path.

7. Apparatus for removing photographic film from containers of the type wherein the film is convoluted on a core which is confined in and is rotatable relative to a substantially cylindrical deformable shell with a longitudinally extending mouth for the passage of film and wherein the ends of the shell carry two apertured end walls which afford access to the core and at least one of which is detachable from the shell, comprising means for locating a container at a film removing station where the shell of the thus located container is maintained in a predetermined axial and angular position; means for deforming the shell of the container at said station so as to reduce the width of the mouth; means for detaching the one end wall from the deformed shell; means for rotating the core in the shell in a direction to collect the film; film engaging means operative to prevent clockspringing of film during rotation of the core in said direction; and means for removing the film from the shell including a shifting member arranged to effect a relative axial movement between the shell and the core.

8. Apparatus as defined in claim 7, wherein said deforming means comprises two jaws located at the opposite sides of a shell at said station and means for moving said jaws radially of into and from deforming engagement with a shell therebetween.

9. Apparatus as defined in claim 7, wherein said detaching means includes a stripping member which is movable radially of the shell at said station and means for moving said stripping member radially toward and away from a shell at said station.

10. Apparatus as defined in claim 7, wherein said shifting member is movable radially and axially of a shell at said station and said removing means further comprises means for moving said shifting member.

11. Apparatus as defined in claim 7, further comprising drive means for rotating the removed film in a direction to unwind the film from the core, including a driving member movable radially of the removed film and means for moving said driving member.

12. Apparatus as defined in claim 11, further comprising means for operating said deforming means, said detaching means, said rotating means, and removing means and said means for moving said driving member in a predetermined sequence.

13. Apparatus as defined in claim 7, wherein said film engaging means comprises an elastic sheet-like tool which extends through the mouth of the shell at said station, at least while said rotating means is operative to collect the film on the core.

14. Apparatus as defined in claim 13, wherein the width of said tool approximates or equals the width of the film.

15. Apparatus as defined in claim 13, wherein said tool is secured to said locating means and said locating means is movable between first and second positions in which a container thereon is respectively located at and without said station.

16. Apparatus as defined in claim 15, wherein said locating means is pivotable between said first and second positions.

17. Apparatus as defined in claim 15, wherein a container is connectable to said locating means by hand while said locating means is maintained in said second position, and the connection of a container to said locating means involves introducing said tool into the mouth of the respective shell.

18. Apparatus as defined in claim 7 for removing film from containers wherein the shell has a circumferential groove located adjacent to the one end wall and said detaching means comprises a stripping member which is movable radially of a shell at said station and includes at least one prong having a portion which enters said groove during movement of the prong toward a shell at said station to thereby detach the one end wall from the shell.

19. Apparatus as defined in claim 18, wherein said stripping member is a fork including two prongs having portions which enter simultaneously the groove of a shell at said station while said stripping member is being moved radially toward a shell at said station.

20. Apparatus as defined in claim 18, wherein said portion of said prong is a curved blade.

21. Apparatus as defined in claim 7 wherein said shifting member of said removing means is movable radially and axially of a shell at said station and has a recess large enough to permit passage of the convoluted film therethrough but small enough to prevent the passage of the shell, said removing means further comprising means for moving said shifting member radially of a shell at said station to thereby place said recess into registry with the convoluted film in such shell and thereupon axially toward the shell at said station to move the shell axially and away from the convoluted film.

22. Apparatus as defined in claim 21, wherein said means for rotating the film in a shell at said station comprises two coaxial rotary shafts movable axially into and from torque-transmitting engagement with the respective ends of a core at said station, said shifting member of said removing means having a gap communicating with said recess thereof and being wide enough to permit the entry of one of said shafts into said recess during radial movement of said shifting member to place said recess into register with convoluted film at said station.

23. Apparatus as defined in claim 7, further comprising drive means for rotating the removed film in a direction to unwind the film from the core, including an endless belt, means for driving said belt, and means for moving said belt against the film at said station.

24. Apparatus as defined in claim 23, wherein said drive means further comprises a plurality of rollers, said belt being trained over said rollers and one of said rollers constituting said means for driving said belt.

25. Apparatus as defined in claim 24, wherein said drive means further comprises resilient means arranged to bias one of said rollers against and to thereby tension said belt.

26. Apparatus as defined in claim 7, further comprising drive means for rotating the removed film in a direction to unwind the film from the core, guide means defining a predetermined path for the leader of the film, and means for directing the leader into said path.

27. Apparatus as defined in claim 26, wherein said means for directing the leader into said path constitutes said film engaging means.

* * * * *